Oct. 15, 1968     C. V. ROBINSON     3,405,743
REINFORCING MAT FABRICATING APPARATUS
Filed Sept. 29, 1965     4 Sheets-Sheet 1
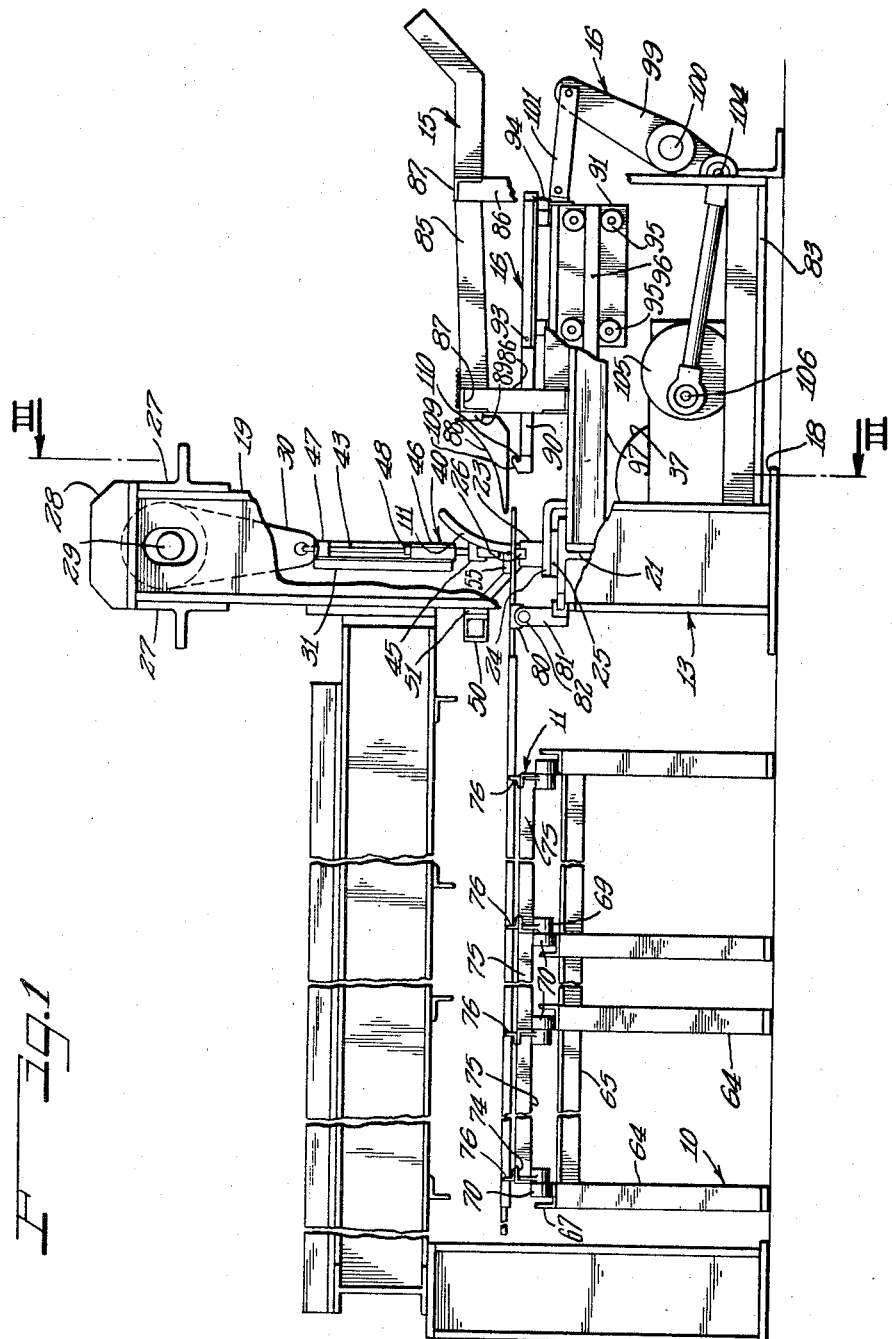
INVENTOR.
*Charles V. Robinson*
BY *Hill, Sherman, Meroni, Gross & Simpson* ATTORNEYS

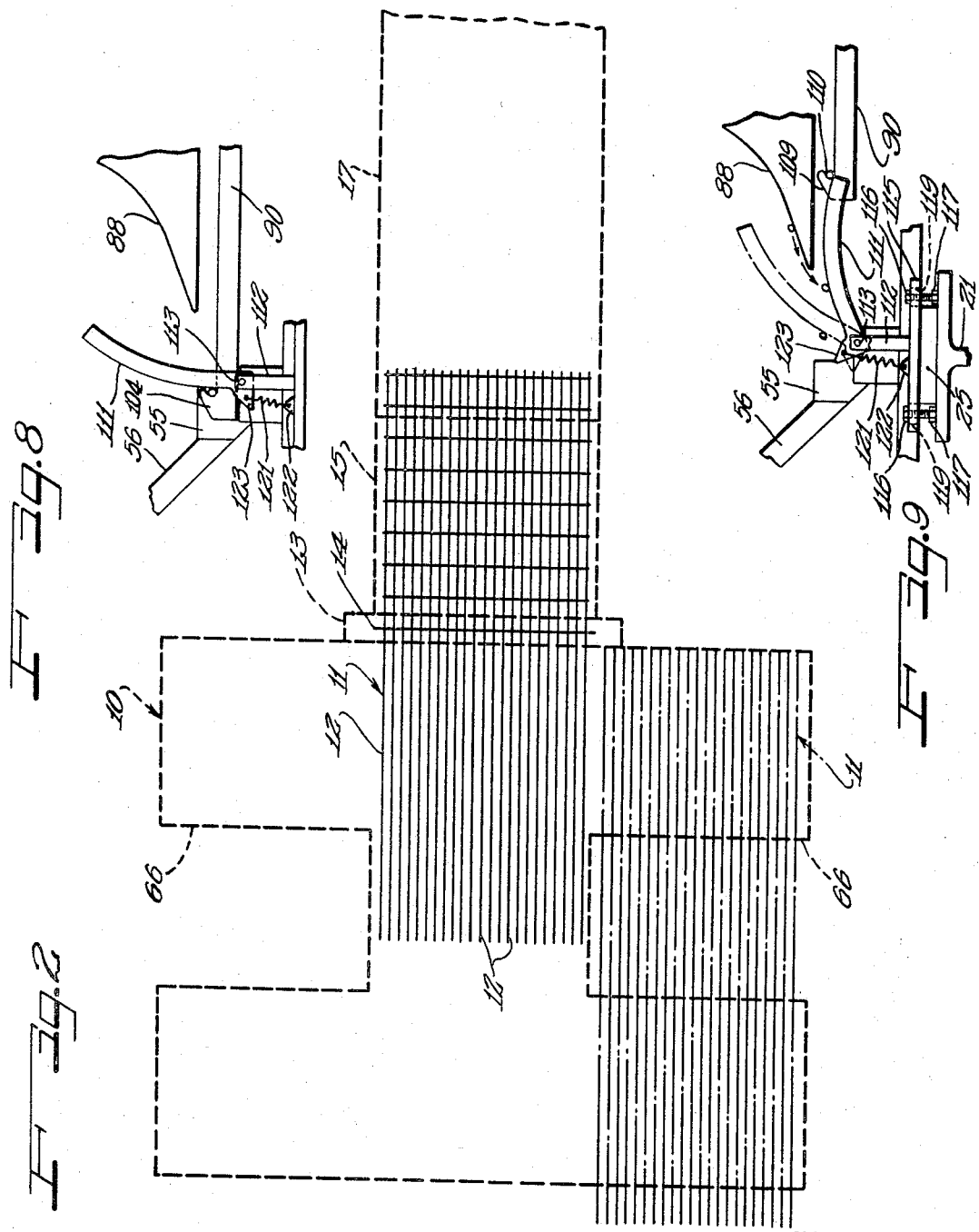

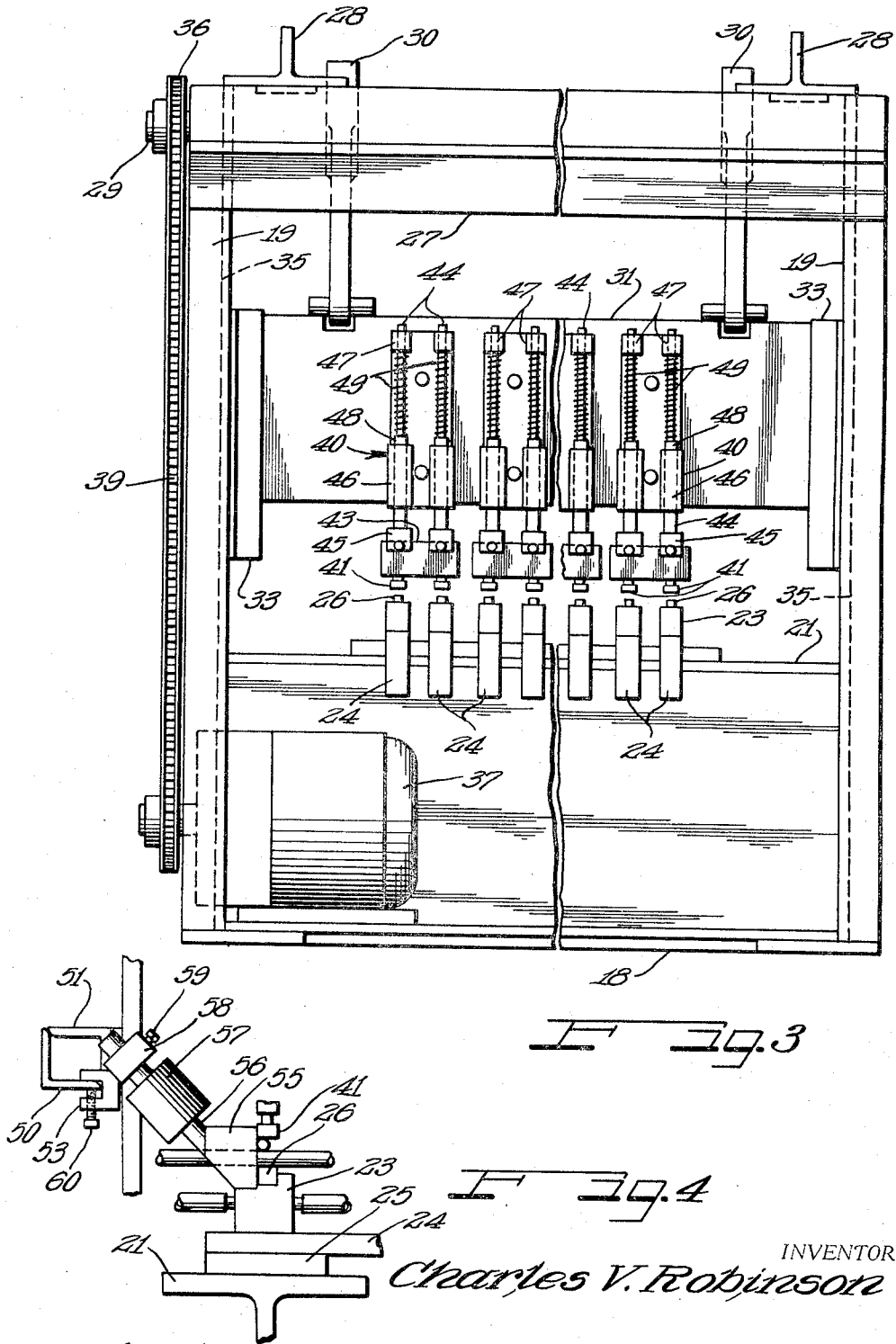

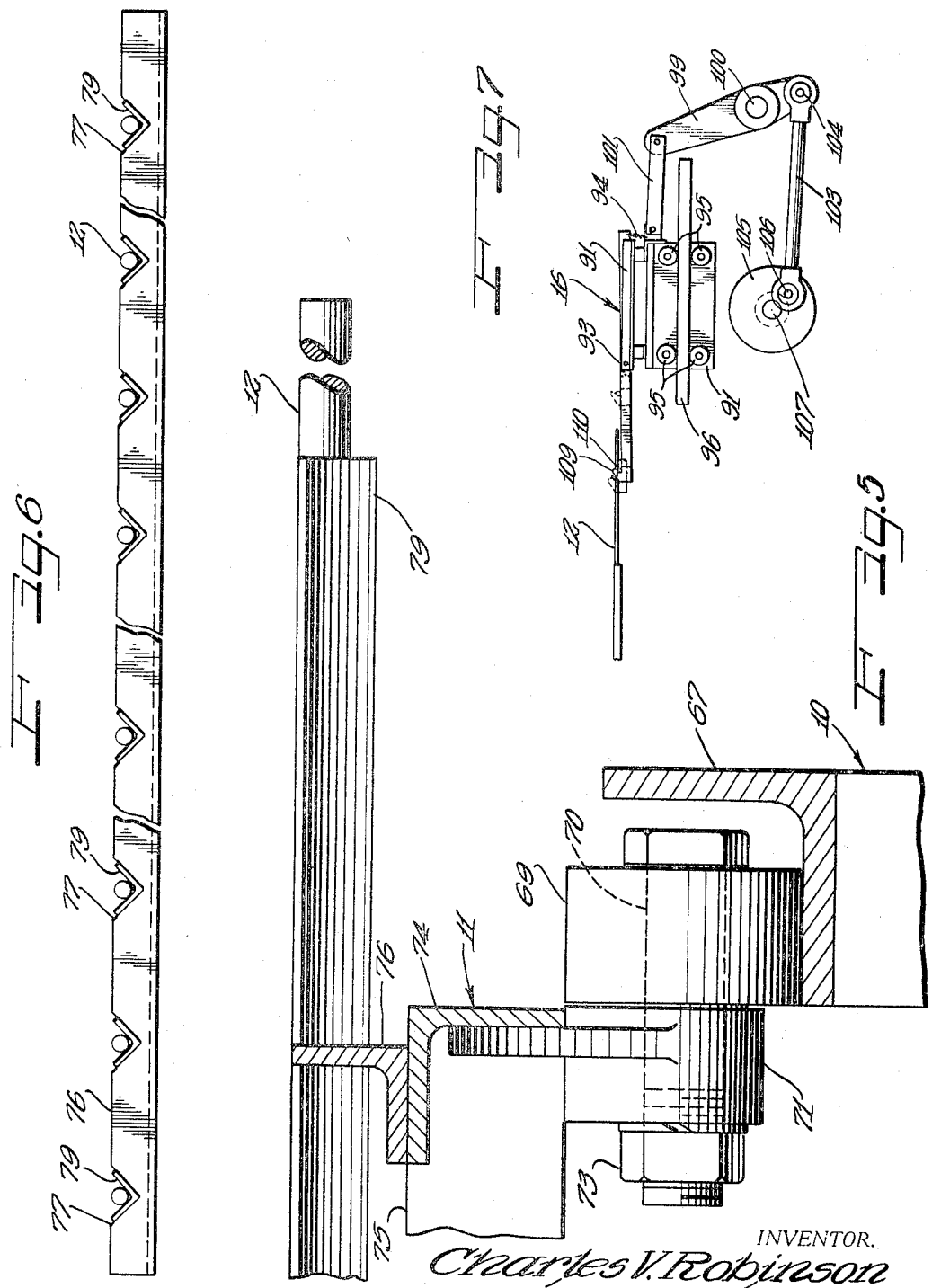

United States Patent Office 3,405,743
Patented Oct. 15, 1968

3,405,743
REINFORCING MAT FABRICATING APPARATUS
Charles V. Robinson, Sterling, Ill., assignor to Northwestern Steel and Wire Company, Sterling, Ill., a corporation of Illinois
Filed Sept. 29, 1965, Ser. No. 491,336
14 Claims. (Cl. 140—112)

ABSTRACT OF THE DISCLOSURE

Machine for fabricating reinforcing mats made from large diameter rods. The machine has a central section having a plurality of stationary welding blocks corresponding to the line wires of the mat and a ram carrying individual welding units guided for vertical movement toward and from the welding blocks. At least two line wire tables are mounted in side-by-side relation in advance of the welding blocks for movement transversely of the welding blocks. Each table has parallel jigs for the line wires extending therealong. One jig may be loaded while the other jig is supplying line wires to the welding blocks. A stay wire table is on the opposite side of the welding section from the line wire tables and has a sloping discharge end facing the welding blocks to discharge stay wires onto the line wires beneath the welding units. Magnetic stops limit movement of the stay wires into position beneath the welding blocks. Guide and clamping members form continuations of the sloping discharge end of the stay wire support table and guide and impel the stay wires to the welding blocks and clamp the stay wires in position against the magnetic stops, for welding. The welded stay wires and cross wires are advanced by pull arms engaging a welded stay wire and advancing the mat a distance equal to the required spacing of the stay wires on the line wires after each welding operation.

Summary and objects of the invention

A principal object of the invention is to provide a new and improved apparatus for fabricating reinforcing mats, arranged with a view toward utmost efficiency and simplicity in construction and operation.

Another object of the invention is to provide an improved welding assembly for fabricating reinforcing mats having improved forms of jigs for the line wires together with an improved feed for the stay wires feeding the stay wires in overlying relation with respect to the line wires, in which the locations of the stay wires along the line wires are determined by an advancing means for the mat, pulling the mat distances equivalent to the spacings between the stay wires at the termination of each welding operation.

Another object of the invention is to provide an improved form of reinforcing mat fabricating apparatus, in which stay wires overlie a series of aligned line wires and are welded thereto, and having an improved form of stay wire feed and supply means together with an advancing means for the mat at the termination of each welding operation, in which the stay wires are maintained in engagement with the advancing means by spaced clamping arms guiding the stay wires to the welding heads and retracted by retractable movement of the advancing means for the mat, at the termination of each welding operation.

A still further object of the invention is to provide a novel and improved apparatus for fabricating reinforcing rods, in which a plurality of reciprocably movable welding heads are guided for movement toward and from the line wires, and feed arms supply the stay wires to the line wires to magnetic holding means in association with the welding heads, and wherein a reciprocable advancing means for the mat passes under and engages the welded stay wire and advances the mat for a next succeeding welding operation at the termination of each welding operation.

A still further object of the invention is to provide an improved stay wire feed and clamping means, clamping the stay wires in position over the line wires beneath a series of welding heads, in which the clamping means positions the stay wires along stops beneath the welding heads and guides the stay wires in position, and in which the advancing means for the mat retractably moves the clamping means from the mat during a mat advancing operation, and releases the clamping means at the termination of a mat advancing operation, upon movement toward a position behind a next adjacent stay wire, supplied thereto by the clamping means.

A still further object of the invention is to improve upon the fabricating apparatus for reinforcing mats heretofore in use in welding the stay wires to line wires by vertically movable welding heads and by providing at least two jig carriages mounted on a shuttle table for movement therealong to one side of the welding heads, accommodating the loading of one carriage as the other carriage is supplying aligned line wires for welding, and accommodating the pushing of the empty carriage into a loading position by the loaded carriage when supplying a next supply of line wires to the carriage for welding.

These and other objects of the invention will appear from time to time as the following specification proceeds and with reference to the accompanying drawings wherein:

FIGURE 1 is a fragmentary view in side elevation, with certain parts broken away of a reinforcing mat fabricating apparatus constructed in accordance with the principles of the present invention;

FIGURE 2 is a diagrammatic plan view illustrating the layout of the mat fabricating apparatus in schematic form;

FIGURE 3 is a fragmentary view of the welding section of the apparatus looking at the welding section along line III—III of FIGURE 1;

FIGURE 4 is a partial fragmentary detail view with certain parts in horizontal section in order to illustrate certain details of the mounting means for the magnetic stops;

FIGURE 5 is an enlarged detail partial fragmentary vertical sectional view illustrating certain details of the jig carriage and support therefor on the shuttle table;

FIGURE 6 is a fragmentary end view showing the support and spacer for the jig angles, maintaining the line wires in position;

FIGURE 7 is a fragmentary generally diagrammatic view illustrating the advancing means for the mat;

FIGURE 8 is a fragmentary side elevational view illustrating the clamping means operated and controlled by the spacer means, and showing the clamping means in a clamping position; and FIGURE 9 is a view similar to FIGURE 8 but showing the clamping means in position to guide and supply stay wires for welding.

In the embodiment of the invention illustrated in the drawings, I have shown in FIGURES 1 and 2 a reinforcing mat fabricating apparatus including a shuttle table 10 supporting at least two jig carriages 11 to accommodate the loading of one carriage while the other carriage is supplying line wires 12 to a welding unit 13, for welding stay or cross wires 14 to the top surfaces of the line wires. I have also shown a stay wire support and feed table 15 at the opposite side of the welding unit 13 from the shuttle table 10, together with a mat advancing unit 16 engaging behind the stay wires and advancing the mat a distance equal to the spacing between the stay wires, for discharge onto a runout table 17 at the termination of each welding operation.

The welding unit as shown in FIGURES 1 and 3, generally includes a base 18 having parallel columns 19, 19 extending upwardly from opposite sides thereof and having an I-beam 21 mounted on the base 18 and extending between said columns and forming a support for a plurality of welding blocks 23 spaced therealong in accordance with the required spacing of the line wires of the finished mat. Each welding block is mounted on the top of and extends upwardly from a suitable shunt 24, which may be a copper shunt energized by a transformer (not shown), in a conventional manner. A spacer bar 25 spaces the shunts from the top surface of the I-beam 21. Each welding block 23 has a welding tip 26 recessed therein having supporting engagement with a line wire. The welding blocks 23 and tips 26 may be cooled by water or any other suitable cooling means in a conventional manner, which is no part of the present invention so need not herein be shown or described in detail.

The columns 19 are connected together at their upper ends by the beams 27 extending along opposite sides thereof and suitably secured thereto and connected together by bearing support pads 28, 28 forming bearing supports for a drive shaft 29 having spaced eccentric straps 30, 30 rotatably journalled thereon eccentric of the centers thereof, and suspending and reciprocably moving a ram 31 toward and from the welding tips 26. The ram 31 has spaced guide blocks 33, 33 at its opposite ends suitably guided in rectilinear vertically extending channelled guides 35, 35 formed in the inner faces of the columns 19, 19, and guiding the ram 31 for rectilinear movement toward and from the felding tips 26, 26. The eccentrics and eccentric straps on a shaft 29 may be of conventional forms and are no part of the present invention so need not herein be shown or described further.

The shaft 30 has a sprocket 36 on its outer end driven from the motor 37 through a speed reducer (not shown), driving a chain and sprocket drive 39, for continuously driving the sprocket 36 and drive shaft 29 as long as the motor 37 is in operation.

The ram 31 has a plurality of welding assemblies 40 supported thereon (FIGURES 1 and 3). Each welding assembly 40 is shown as having two welding tips 41 cooperating with the welding tips 26 and yieldably engaging the cross wires for welding the cross wires to the line wires in a conventional manner. As shown in FIGURES 1 and 3, two laterally spaced welding tips 41 are mounted on and depend from a block 43, suspended from spaced spindles 44 on clevises 45, on the lower end of said spindles. The spindles 45 are slidably guided in spaced guides 46 and 47, mounted on the ram 31 and shown as extending from the side thereof facing the stay wire rack or table 15. A nut 48 threaded on a spindle 43 may abut the top surface of the guide 46 to retain the spindle thereto, while a spring 49 encircling the spindle 43 may be interposed between the top of the nut 48 and the bottom of the guide 47, the nut forming a means for adjusting the position of the block 43 with respect to the ram 31 and for adjusting the tension of the spring 49.

A beam 50 in the form of an angle iron is mounted at its ends on the columns 19 on the sides thereof facing the jig carriage 11, on outwardly facing angle brackets 51, on the ends of the legs of said angle brackets. The horizontal leg of the beam 50 is disposed outwardly of and above the welding tips 26 and faces said welding tips. A series of clamping devices 53 for magnetic stop blocks 55 on the lower ends of cores 56 are carried by said beam. The cores 56 are encircled by electromagnetic coils 57 and are adjustably mounted on collars 58 extending angularly upwardly from the clamping devices 53 toward the welding heads, and welded or otherwise secured thereto. Set screws 59 adjustably hold the cores 56 and stop blocks 55 in position and accommodate said stop blocks to be adjusted to stop the stay wires with their centers in aligned relation with respect to the welding tips 26. Set screws 60 clamp the clamping devices to the beam 50 and accommodate adjustment of the stop blocks along said beam. While the cores 57 are shown as being encircled by electromagnetic coils, it should be understood that the stop blocks 55 may be permanent magnets.

The shuttle table 10 comprises a plurality of sets of legs 64, 64 connected together by angles 65, 65 extending in the direction of the line wires and having upwardly facing angle tracks 67 secured to the tops thereof and facing each other to form tracks for rollers 69 supporting the jig carriages 11, 11 for movement from one side of the welding unit to a position in front of the welding unit. The space between the innermost angle tracks on opposite sides of the portion of said shuttle table in alignment with the welding unit is open as designated by reference character 66 and diagrammatically shown in FIGURE 2, to enable an empty carriage on one side of the carriage to be loaded with line wires and then push an empty carriage to the opposite side of the welding unit from the loaded carriage, when pushing the loaded carriage to position the line wires therein in position for welding.

The rollers 69 supporting the carriage 11 are mounted on the outer ends of shafts 70 extending through and secured to hangers 71, as by nuts 73 threaded on the inner ends of said shafts. The hangers 71 are shown as extending along the insides of the vertical legs of transversely extending angle beams 74 of the jig carriage 11. The angle beams 74 are suitably connected together by longitudinally extending beams 75, which may also be in the forms of angles and form supports on their horizontal legs for upwardly extending spacer angles 76, extending transversely of the jig carriage. The spacer angles 76 have upwarding opening V-shaped notches 77 formed therein in accordance with the required spacing of the line wires or of the mat and forming spacer supports for upwardly facing jig angles 79, mounted therein and extending forwardly of the forwardmost spacer angles 76, to positions adjacent guides 80 for the line wires. The guides 80 may be in the form of upwardly facing angles and are shown as being pivoted on individual upright support arms 81 on pivot pins 82. The arms 81 extend upwardly of the beam 27 between the carriage 11 and welding tips 26 and position the guides 80 in alignment with said welding tips.

In loading the jig carriage, the line wires, which may be reinforcing bars, are placed in the jig angles 79 with their forward ends aligned substantially in alignment with the forward ends of the jig angles 79. The jig carriage 11 may then be moved along the angle tracks 67 until the jig angles 79 and line wires or bars 12 are in alignment with the guides 80. The bars 12 then project beyond the rear ends of the jig angles and are pushed from the rear ends thereof onto and along the guides 80 and along the top surfaces of the welding tips 26, at which time stay wires 14, which also may be reinforcing bars are sequentially loaded onto the line wires one by one against the stop blocks 55 for a welding operation.

As the jig angles guide the line wires for the fabrication of a reinforcing mat, a jig carriage 11 positioned on the shuttle table to either side of the jig carriage supplying line wires for welding, may then be loaded with additional line wires. As the completed mat is drawn from the jig angles 79 of the first jig carriage and the second jig carriage is loaded, the second jig carriage is then moved into position in front of the welding unit with the line wires in alignment with the guides 80. This pushes the first jig carriage, which is now empty, along the shuttle table to the opposite side thereof from the side previously occupied by the second jig carriage, to be loaded with line wires during the fabrication of a next succeeding reinforcing mat. A loaded jig carriage may thus be available for supplying jig wires for fabrication into a mat with no delay except the time required to move the loaded jig carriage into position and to advance the line wires to the guides 80 to extend in centered relation with respect to the welding tips 26, 26.

It should here be understood that the spacing of the jig angles may be varied from the spacing shown to provide various desired mat patterns to suit individual reinforcing conditions.

Referring now in particular to the stay wire supply table or rack 15, a frame structure 83 is secured to and extends from the welding unit 13 on the insides of the columns 19 and forms a support for the motor 37 and drive mechanism driven from said motor for moving the ram 31 up and down along the columns 19, and for moving the mat advancing mechanism 16 to advance the mat a distance equivalent to the spacing of the stay wires on the mat, at the termination of each mat advancing operation. The frame structure 83 forms a support for the stay wire table or rack 15, which in the form of the invention shown comprises a plurality of laterally spaced sloping rails or bars 85 mounted on legs 86 extending upwardly of the top of the frame structure 83 and suitably connected together by transverse angle irons 87.

The rails 85 have a slight slope toward the welding unit 13 and terminate at the horizontal leg of an angle iron 87 leading to sloping feed arms 88, spaced from the angle iron 87 toward the welding unit 13 by a spacer bar 89. The slope of the sloping feed arms 88 is shown as being along a uniform curve, preferably in the form of a parabolic curve having an initial relatively steep slope and flattening out toward its discharge end.

The mat advancing unit comprises a plurality of laterally spaced puller arms 90 spaced along the feed table 15 and disposed therebeneath and transversely pivoted to a reciprocably movable carriage 91 on pivot pins 93. A tension spring 94 is connected between the rear end of the carriage 91 and the end of the arm 90 and biases the puller arm 90 in the generally horizontal position shown in FIGURE 1. The carriage 91 extends for substantially the full width of the frame structure 83 and is reciprocably mounted on said frame structure at its opposite ends on longitudinally and vertically spaced rollers 95, 95 rotatably mounted at opposite sides of the carriage 91 and extending along the top and bottom sides of rectilinear support and guide tracks 96, mounted on and extending inwardly of an upper beam 97, at each side of the frame structure 83. The carriage 91 and puller arms 90 are reciprocably moved back and forth by laterally spaced rock arms 99 mounted on a transversely extending rock shaft 100 suitably journalled on the frame structure 83 and extending thereacross. A link 101 is pivotally connected at its opposite ends to the upper end of the rock arm 99 and the rear end portion of the carriage 91. A connecting rod 103 is pivotally connected to the rock arm 99 at the lower end of said rock arm on a pivot pin 104. The opposite end of said connecting rod is connected with a disk 105 eccentric of the center of said disk on a pivot or crank pin 106. The disk 105 in turn is mounted on a transverse drive shaft 107 suitably journalled in the frame structure 83 and extending thereacross. The drive shaft 107 is driven from the motor 37 through suitable speed reducer gearing and a selectively operable clutch (not shown) to rotatably drive the crank pin 106 and reciprocably drive the carriage 91 and puller arms 90 under the control of the operator of the machine, to advance the mat to a new welding position at the termination of each welding operation and to discharge the completed mat onto the runout table 17.

Each puller arm 90 has a camming dog 109 at its advance end having an inclined camming face extending upwardly of the body of the puller arm and terminating into a recess 110 formed on a radius corresponding to the radii of the stay wires, and engaging behind the stay wires and drawing the mat a distance equal to the spacing of the stay wires during each return motion of the carriage 81.

It may be seen from FIGURE 7 that as the puller arms 90 are moving on their advance or forward strokes the dog 109 will engage the stay wire and effect pivotal movement of the puller arm under the stay wire about the axis of the pivot pin 93. The tension spring 94 will then bring the puller arm upwardly to effect engagement of the notch 110 behind the stay wire. Then upon return travel of the cariage 91, assuming the stay wire is welded to the line wires, the entire mat will be advanced a distance equal to the return stroke of the puller arms 99 into position for the laying of a next succeeding stay wire thereon, along the vertical faces 62 of the magnets 55.

A plurality of laterally spaced stay wire clamps 111 are provided to guide the stay wires to the faces 62 of the magnets 55 and to yieldably retain the stay wires thereto during welding (FIGURES 1, 8 and 9). Each stay wire clamp is shown as being in the form of a curved arm extending upwardly of the welding tip 26 and curving toward the feed table 15 as it extends upwardly. The clamp arm 111 is transversely pivoted adjacent its lower end on an upright support leg 112 on a pivot pin 113. The upright support leg is shown in FIGURES 9 and 10 as being mounted on a spacer 115 extending along the top of the spacer 25 and secured to the top flange of the I-beam 21 by bolts 116 threaded in nuts 117 welded or otherwise secured to said top flange. The bolts 116 extend through slots 119 in the plate 115 to accommodate adjustment of the clamp with respect to the stop face of the magnet block 55 in accordance with the diameter of the stay wire.

The clamp 11 is biased in the upright clamping position shown in FIGURE 9 by a tension spring 121 connected between an upright ear 122 extending upwardly of the plate 115 and a lug 123 extending from the lower end portion of the clamp 111 toward the jig carriage 11, when said arm is in its clamping position.

It may be seen from FIGURE 9 that as the puller arms 90 engage behind the stay wires 14 and advance the reinforcing mat for a new welding operation, the stay wires 14 riding along the curved surface of the clamping arms 111 will cam said clamping arms downwardly into a release position and extend the curved surfaces of said clamping arms beneath the discharge ends of the parabolic slides 88. A stay wire moving along the slide may then drop onto the clamping arms 111, and as the mat is moved to advance the welded stay wire beyond the ends of the arms 111 the tension springs 121 will release said arms to guide and impel a stay wire into engagement with the stop faces of the magnet blocks 55, and will retain the stay wires thereto for a next succeeding welding operation.

It should here be understood that the present mat fabricating apparatus is particularly adapted to fabricate mats from relatively large diameter wires, which may be in the form of reinforcing bars, and that when referring to wires it is intended that the wires be of the required diameter for the particular mat being fabricated, and also be of the diameters of conventional reinforcing bars or larger.

While I have herein shown and described one form in which the invention may be embodied, it may readily be understood that various variations and modifications in the invention may be attained without departing from the spirit and scope of the novel concepts thereof.

I claim as my invention:

1. A welding assembly particularly adapted for fabricating reinforcing mats and the like comprising, a transverse frame having a plurality of welding blocks spaced therealong, a ram guided in said frame for vertical movement toward and from said welding blocks and having a plurality of spaced welding heads cooperating with said welding blocks, a shuttle table on one side of said frame and welding blocks, a stay wire table on the opposite side of said welding blocks, mat advancing means including a plurality of reciprocably movable puller arms engaging the stay wires at the limit of movement thereof and movable to advance the mat a distance equal to the required spacing of the stay wires on the line wires, and at least one jig carriage mounted on said shuttle table for movement therealong and positionable to register line wires mounted thereon in alignment with said welding blocks.

2. A welding assembly particularly adapted for fabricating reinforcing mats and the like comprising,
a transverse frame having a plurality of welding blocks spaced therealong,
a ram guided in said frame for vertical movement toward and from said welding blocks and having a plurality of spaced welding heads cooperating with said welding blocks,
a shuttle table on one side of said frame and welding blocks,
a stay wire table on the opposite side of said welding blocks,
mat advancing means including a plurality of reciprocably movable puller arms engaging the stay wires at the limit of movement thereof and movable to advance the mat a distance equal to the required spacing of the stay wires on the lines wires,
at least two jig carriages mounted on said shuttle table for movement from either side of said frame to position line wires loaded thereon in aligned relation with respect to said welding blocks, to accommodate the loading of one jig table during the supply of line wires on the other jig table to said welding blocks, and to accommodate a loaded jig table to be moved to align its line wires with said welding blocks and move an empty table into position for loading.

3. A welding assembly in accordance with claim 2, wherein the stay wire table includes a table section and sloping feed arms leading downwardly therefrom into positions adjacent said line wires for supplying stay wires to overlie said line wires in registry with said welding blocks.

4. A welding assembly in accordance with claim 3, wherein a plurality of clamping arms are provided adjacent said welding blocks and are pivoted for movement toward and from said welding blocks and are retractable to form continuations of said feed arms and extensible to clamping positions to move and clamp the stay wires in position on said welding blocks.

5. A mat fabricating apparatus in accordance with claim 3,
wherein a plurality of stops are provided for stopping said stay wires in aligned relation with respect to said welding blocks and welding heads,
wherein a plurality of clamping arms are pivotally mounted on said frame structure for movement toward and from said stops and form continuations of said sloping feed arms in one position,
and wherein spring means move said clamp arms to positions adjacent said stops to advance the stay wire from said feed arms to said stops and clamp the stay wire in position along said stops.

6. A mat fabricating apparatus in accordance with claim 5,
wherein a mat advancing means is provided to advance the mat the required distance to uniformly space the stay wires therealong,
wherein the mat advancing means includes a plurality of puller arms engaging behind the stay wires and moving the stay wires past the welding blocks and retracting the clamping arms by engagement of the stay wires therewith, and releasing the clamping arms to move a next succeeding stay wire into engagement with said stops at the termination of each mat advancing operation.

7. A mat welding apparatus in according with claim 6, wherein the puller arms are transversely pivoted to a reciprocably movable carriage and are yieldably biased into a generally horizontal operative pull up position and have camming dogs at the advance ends thereof camming said puller arms to pass beneath the stay wires on said welding blocks and engage behind a stay wire to engage a stay wire and effect a mat advancing operation.

8. A mat fabricating apparatus in accordance with claim 7,
wherein the stops are magnetic stop blocks.

9. In a welding assembly for reinforcing mats and the like,
a plurality of laterally spaced stationary welding blocks,
an elongated ram guided for vertical movement toward and from said welding blocks,
welding means mounted on said ram and depending therefrom in alignment with said welding blocks, for welding the stay wires to the line wires on said welding blocks,
a line wire table on one side of said welding blocks,
line wire jig means extending along said table and including a plurality of parallel elongated upwardly facing line wire positioning jigs in alignment with said welding blocks and extending in juxtapositon thereto,
a stay wire support table on the opposite side of said welding blocks from said line wire table and having a sloping discharge end facing said welding blocks,
stop means limiting movement of said stay wires into position in centered relation with respect to said welding blocks,
guide means cooperating with a sloping discharge end of said stay wire support table guiding and movable upwardly to impel the stay wires to engage said stop means, and
a reciprocably movable advancing means engageable with a stay wire welded to the line wires and movable to advance said stay wire and line wires a distance equal to the spacings of the stay wires on the line wires and to release said guide means to guide and impel a next adjacent stay wire to said welding blocks as a stay and line wire are advanced a distance equivalent to the required stay wire spacings on the line wires.

10. A welding assembly in accordance with claim 9, wherein the stop means is in the form of an individual magnet in association with each welding block and engaged by and holding the stay wire in position for welding, in cooperation with said guide means.

11. A welding assembly in accordance with claim 9, wherein the advancing means comprises a plurality of laterally spaced rectilinearly movable puller arms disposed beneath the stay wires and having engaging end portions yieldably biased upwardly into engagement behind a stay wire on said welding blocks and having advance camming faces camming said puller arms under and beyond a stay wire on said welding blocks against the yieldable bias of said puller arms upon movement of the puller arms in one direction and to engage the engaging end portions of the puller arms with a stay wire upon movement of the puller arms in an opposite direction, to advance the stay wire and line wires welded thereto for a next succeeding stay wire positioning and welding operation.

12. A welding assembly in accordance with claim 9, wherein the guide means guiding and impelling the stay wires to engage the stops comprise:
a plurality of laterally spaced clamps pivoted to said table and biased to impel and maintain the stay wires into engagement with the stop means, and
wherein the advancing means retract said clamps to form continuations of the sloping discharge end of said line wire support table as the mat is moved for a next succeeding positioning and stay wire welding operation.

13. A welding assembly in accordance with claim 12, wherein the sloping discharge end of the stay wire support table is in the form of parallel spaced arms having parabolic sloping surfaces flattening at the discharge ends thereof for discharging the stay wires onto said clamps to be impelled thereby onto said welding blocks and clamped into engagement with said stops.

14. A welding assembly in accordance with claim 9, wherein the means limiting movement of the stay wires comprise a plurality of magnets having stop faces adjacent and to one side of certain of said welding blocks,
wherein the advancing means comprises a plurality of rectilinearly movable transversely pivoted puller arms disposed beneath the stay wires, and spring means biasing said puller arms upwardly into engagement with the stay wires, and having stay wire engaging portions movable into position along the sides of the stop faces of said magnets into engagement with the stay wires and rectilinearly movable away from stops distances equivalent to the required spacing of the stay wires along the mat,
wherein the guide means guiding and impelling the clamps to engage the stop faces are transversely pivoted adjacent the stop faces of said magnets and are yieldably biased to maintain the stay wires into engagement with said stop faces,
wherein the puller arms retract said clamps upon the advance of the mat for a next succeeding stay wire positioning and welding operation,
and wherein the stay wire clamps form continuations of the sloping discharge end of the stay wire feed table and are released upon advance of the mat into a next succeeding stay wire locating and welding position, to effect a next succeeding stay wire positioning and clamping operation.

References Cited

UNITED STATES PATENTS 1,984,742 12/1934 Hauck.
2,422,829 6/1947 Potie.
2,448,941 9/1948 Wickwire.

CHARLES W. LANHAM, *Primary Examiner.*

L. A. LARSON, *Assistant Examiner.*